United States Patent [19]

Meyer et al.

[11] Patent Number: 4,809,069
[45] Date of Patent: Feb. 28, 1989

[54] MULTIFUNCTION MEMORY FOR DIGITAL TELEVISION

[75] Inventors: Edwin R. Meyer; Saiprasad V. Naimpally, both of Knoxville, Tenn.

[73] Assignee: North American Philips Corporation, New York, N.Y.

[21] Appl. No.: 166,279

[22] Filed: Mar. 10, 1988

[51] Int. Cl.[4] .................. H04N 5/208; H04N 5/272
[52] U.S. Cl. ..................................... 358/166; 358/37; 358/183
[58] Field of Search ............... 358/166, 167, 36, 37, 358/183, 22

[56] References Cited

U.S. PATENT DOCUMENTS

| | | | |
|---|---|---|---|
| 4,058,836 | 11/1977 | Drewery et al. | 358/167 |
| 4,194,219 | 3/1980 | Drewery | 358/167 |
| 4,249,209 | 2/1981 | Storey | 358/167 |
| 4,249,210 | 2/1981 | Storey et al. | 358/167 |
| 4,485,403 | 11/1984 | Illetschko | 358/167 |
| 4,494,140 | 1/1985 | Michael | 358/167 X |
| 4,549,213 | 10/1985 | Illetschko | 358/167 |
| 4,665,438 | 5/1987 | Miron et al. | 358/183 |
| 4,748,498 | 5/1988 | Yamanishi et al. | 358/166 |

FOREIGN PATENT DOCUMENTS

| | | | |
|---|---|---|---|
| 55-11678 | 1/1980 | Japan | 358/167 |
| 55-102972 | 8/1980 | Japan | 358/167 |
| 809657 | 2/1981 | U.S.S.R. | 358/166 |

*Primary Examiner*—James J. Groody
*Assistant Examiner*—E. Anne Faris
*Attorney, Agent, or Firm*—Marianne R. Rich

[57] ABSTRACT

A digital television processing section capable of picture enhancement, progressive scanning, and multiple picture-in-picture processing is provided. The preferred digital television processing section preferably comprises a picture enhancement processor (PEP), a progressive scan processor, a picture in picture processor, at least one multiplexing means, and a common memory means. The PEP broadly comprises a parameter control means, a memory input select means, and mixer for obtaining current video data, delayed video data from the common memory, and control information from the control means, and for processing the obtained data and information to provide a signal to the progressive scan processor. In various modes of operation, the mixer also provides the signal to the memory input select means which forwards the information to the common memory. The common memory is used as a field delay device and feeds a delayed signal forward to the progressive scan processor. The progressive scan processor then utilizes the current signal and the delayed signal to provide a non-interlaced display. The delayed signal from the common memory may also be fed back to the mixer of the PEP so that noise reduction and/or cross-color effect reduction may be accomplished or so that stored pictures may be displayed. The picture-in-picture (PIP) processor together with a first multiplexer permits main and secondary (PIP) video data to be supplied as current video data to the PEP. Or if desired, up to nine PIPs may constitute the video field.

20 Claims, 12 Drawing Sheets

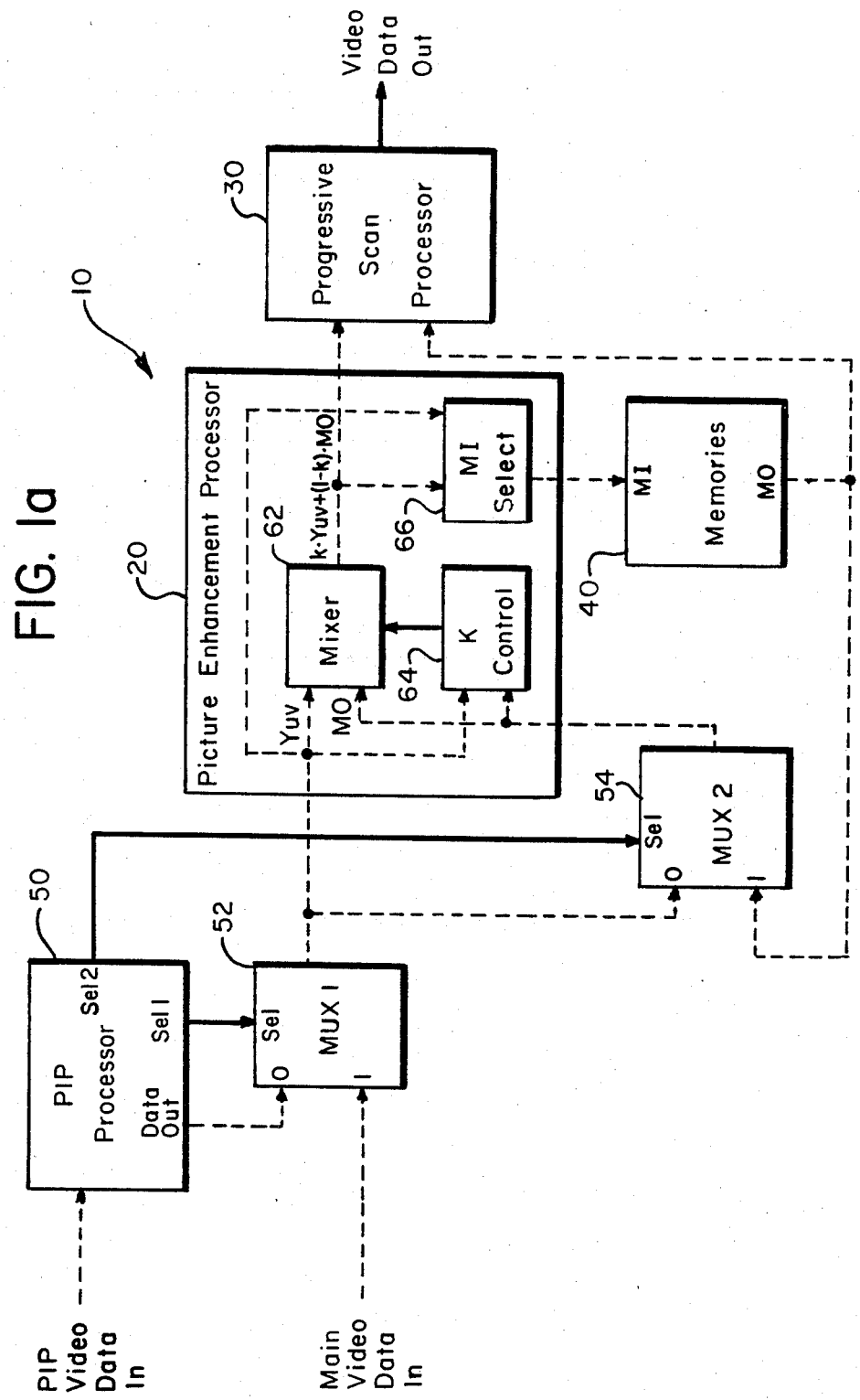

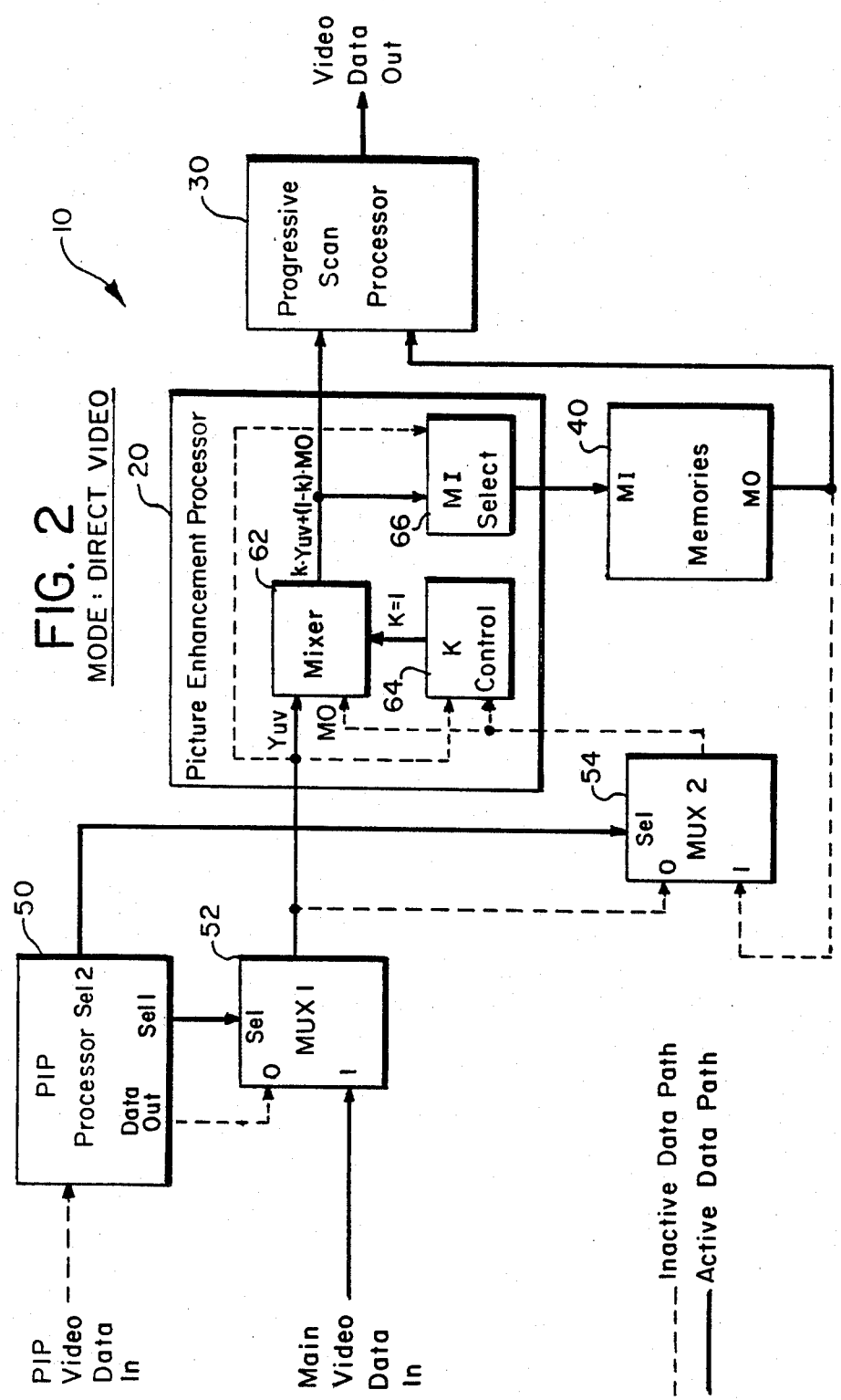

MODE: DIRECT VIDEO + PIP

MODE: NOISE REDUCTION

MODE: NOISE REDUCTION + PIP

MODE: CROSS COLOR REDUCTION

MODE: CROSS COLOR REDUCTION + PIP

MODE: STORED PICTURE

MODE: STORED PICTURE + PIP

MODE: RECALL PICTURE OR FREEZE PICTURE

MODE: MPIP

MULTIFUNCTION MEMORY FOR DIGITAL TELEVISION

BACKGROUND

This invention relates to televisions, and more particularly to digital televisions capable of picture enhancement as well as picture in picture processing.

Digital televisions incorporating advanced features are now known in the art. While different digital televisions incorporate different features such as multiple picture in picture processing, picture enhancement processing (e.g. freeze, store and recall picture processing, noise reduction, and cross-color effect reduction), and progressive scan processing (e.g. median filtering, etc.), none of the televisions in the art are known to provide all three processing features.

In providing a picture in picture (PIP) process, a processing block obtains a secondary source of digital video, and processes the main video signal such that the secondary video source data is displayed as a small picture within the main picture. If desired, multiple PIPs can be produced. With multiple PIPs, typically all but one of the smaller pictures are frozen and a large amount of memory is required to store the frozen frames.

In freezing, storing, and recalling a main picture, video data must be retained and returned to the processor so that the frozen picture may be displayed. Thus, a large memory which is often comprised of charged coupled devices (CCD) or dynamic RAMs (DRAM) is typically utilized for this purpose (i.e. to feed stored data to the processor). If instead of freezing, storing and recalling a main picture, it is desirable to effect noise reduction and/or cross-color reduction (picture enhancement), the same second large memory is often utilized as a field delay. With a field delay, implementation may be had of a first order recursive filter that can accomplish noise reduction. Likewise, by adding the color data from a video line delayed by the field memory to color data from a current video line, cross-color effects may be reduced. Cross color effects are also known to be somewhat reduced by the recursive filter used for reducing noise.

In the progressive scanning process which produces a non-interlaced display by interpolating and inserting an extra line between current video lines, a large memory is required. The most effective progressive scan algorithm, median filtering, requires field delayed data, and a separate memory means for delaying the field has been provided in the past in conjunction with any progressive scan processor.

While picture in picture, picture enhancement, and progressive scan processing are all known, they have not all been utilized together. One possible reason for the failure to combine technologies is the large amount of memory required for each process, and the resulting expense.

SUMMARY OF THE INVENTION

It is therefore an object of the invention to provide a digital television processing section capable of picture enhancement processing and progressive scan processing, which utilizes a common memory means.

It is another object of the invention to provide a digital television processing section capable of picture enhancement processing, progressive scan processing, and multiple PIP processing, where at least one PIP is current, and at least one PIP is frozen.

In accord with the objects of the invention, a television processing section which processes video component data (Y,U,V) is provided and comprises a picture enhancement processor, a progressive scan processor, and a common memory means. The picture enhancement processor broadly comprises a parameter control means, a memory input select means, and a mixer. The mixer obtains current video data, video data from the common memory, and control information from a control means, and processes the obtained data and information to provide a signal to the progressive scan processor. In various modes of operation, the mixer also provides the signal to the memory input select means which forwards the information to the common memory. The common memory is used as a field delay device and feeds a delayed signal forward to the progressive scan processor. The progressive scan processor then utilizes the current signal and the delayed signal to provide a non-interlaced display. In various modes of operation, the delayed signal from the common memory is also fed back to the mixer of the picture enhancement processor so that noise reduction or cross-color effect reduction may be accomplished. The feedback loop from the picture enhancement processor to the common memory means and back to the picture enhancement processor may also be utilized to perform functions of freezing, storing and recalling of a picture.

In a second and preferred embodiment, the digital television processing section further comprises a picture in picture processor and at least one multiplexing means. The PIP processor obtains video data from at least one secondary source and arranges the data such that it may be multiplexed with the main video data by a first multiplexer and sent to the mixer of the picture enhancement processor. Where the PIP processor permits multiple pictures in picture, if at least one PIP is to maintained current and at least one PIP is frozen, the control information from the control means of the picture enhancement processor must be changed to different values in an extremely quick manner. Where the control information cannot be so controlled, a second multiplexer is provided. The second multiplexer multiplexes current information from the PIP processor (via the first multiplexer) with the delayed information (frozen picture information) being fed back from the common memory to the picture enhancement processor. In this manner, the mixer of the picture enhancement processor treats all of the obtained information in a uniform manner (i.e. the control information need not change), even though current video data is being procesed as well as delayed or recirculated data.

A better understanding of the digital television processing section of the invention which uses common memory, and additional advantages and objects of the invention will become apparent to those skilled in the art upon reference to the detailed description and accompanying drawings.

BRIEF DESCRIPTION OF THE DRAWINGS

FIG. 1a is a block diagram of the preferred embodiment of the invention;

FIG. 1b is a more detailed block diagram of the preferred embodiment of the invention shown in FIG. 1a;

FIG. 2 is a block diagram with indicated data paths for the direct video mode of the invention;

DETAILED DESCRIPTION OF THE PREFERRED EMBODIMENT

Figure 1B:
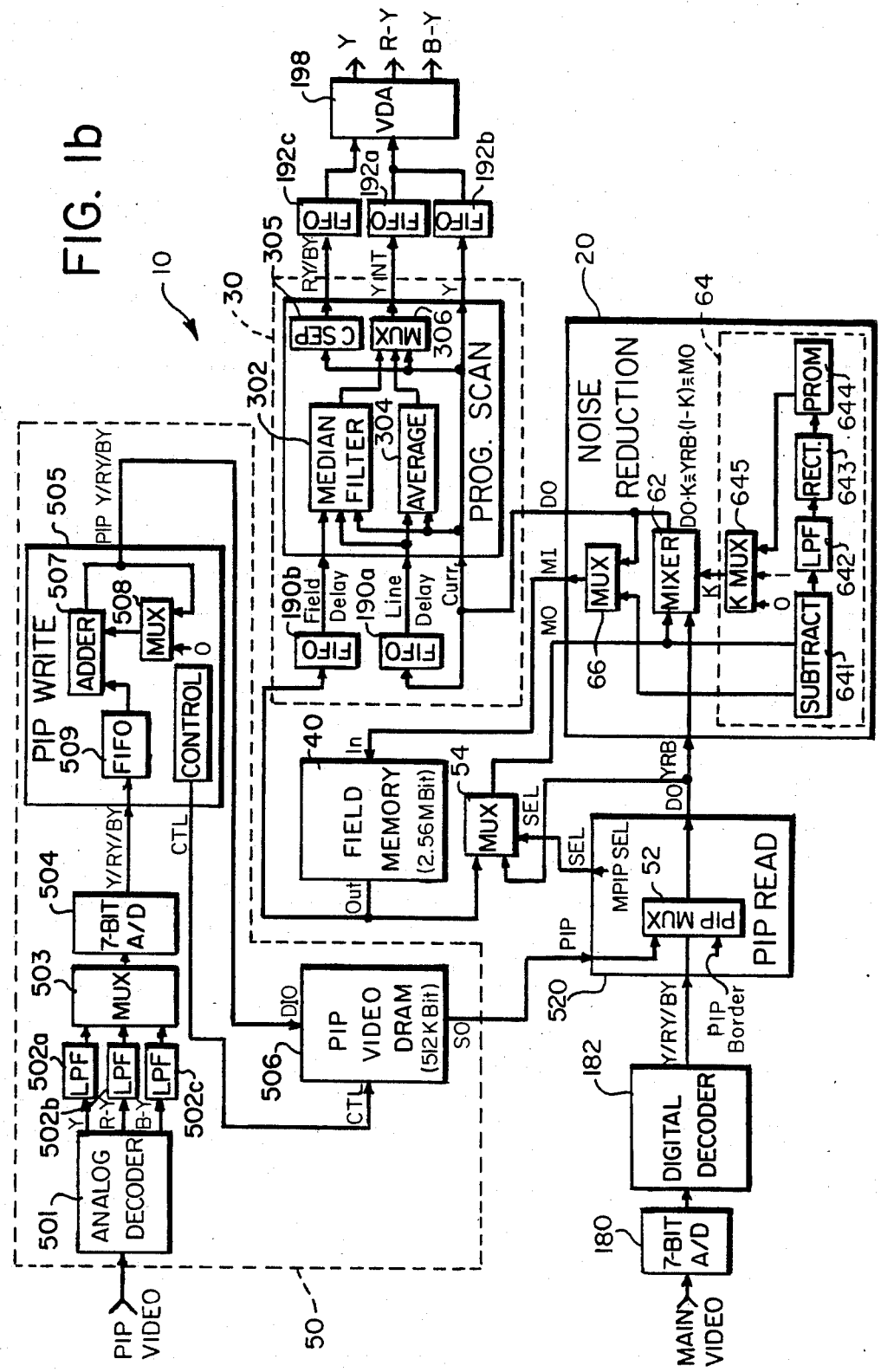

Turning to FIG. 1a, the components of the television processing section 10 of the invention are seen. In accord with one embodiment, the processing section 10 includes a picture enhancement processor 20, a progressive scan processor 30, and a common memory means 40, where information is fed forward from both the picture enhancement processor 20 and the memory means 40 to the progressive scan processor 30, and is also fed back from the memory means 40 to the picture enhancement processor (PEP) 20. In the preferred embodiment, the television processing section 10 further includes a picture in picture (PIP) processor 50 and multiplexers 52 and 54. Multiplexer 52 multiplexes main video data with PIP video data and provides a multiplexed field to the PEP 20. Multiplexer 54, as will be discussed in more detail hereinafter, is not required if the picture enhancement processor 20 is provided with certain hereinafter discussed control switching capabilities. However, without such capabilities, the multiplexer 54 acts to connect the common memory means 40 and/or the information multiplexed by multiplexer 52 to the picture enhancement processor 20.

As indicated in FIG. 1a, the picture enhancement processor is broadly comprised of a mixer 62, a control means 64, and a memory input select means 66. The mixer 62 obtains current video data (YUV) from multiplexer 52, video data (MO; memory output) from the common memory 40, and control information (K) from a control means, and processes the obtained data and information according to the equation $(K \cdot YUV) + (1-K) \cdot MO$. The processed data is then provided to the progressive scan processor 30 and/or to the memory input select means 66. The PEP 20 of the invention is preferably capable of carrying out noise reduction or cross-color effect reduction. The preferred PEP is an integrated circuit, part #SAA9020 manufactured by Elcoma, a Philips Company, Eindhoven, The Netherlands. The memory means 40 is preferably a 64K×4 dynamic RAM (DRAM) manufactured by Mitsubishi under part #M5M4464L in conjunction with gate arrays. Or, if desired, the memory means 40 may be a charged coupled device, part #SAA9001 manufactured by Elcoma, a Philips Compay, Eindhoven, The Netherlands. The progressive scan processor 30 is comprised of circuitry available to those in the art which is capable of conducting any one of several well known algorithms such as line repeat, field insertion, line averaging, and median filtering; the algorithm utilized in the preferred embodiment being median filtering. The PIP processor is likewise comprised of circuitry available to those in the art which is capable of providing a multiple PIP. Preferably, the PIP processor 50 is capable of providing a field which includes three PIP images at a time, including a current image for at least one PIP. In accomplishing the same, limited PIP associated memory such as two video memories, NEC part UPD41264, might be utilized.

More details of the processing section 10 of the invention may be seen with reference to FIG. 1b. Thus, the PIP processor 50 is seen to be comprised of many different elements. Since PIP video is comprised of a composite signal, an analog decoder 501 is used to split the signal up, typically into its luminance component (Y), and into its color components. Due to the slower sampling of PIP signals, the decoded components are filtered by low pass filters 502a, 502b, 502c. The decoded components are then multiplexed by multiplexer 503, and converted into digital signals by the A/D converter 504. The digital signals are then forwarded to the PIP write unit 505 which writes the data into the PIP video DRAM 506, and which conducts vertical filtering of the signals. Filtering is accomplished by use of adder 507 in conjunction with multiplexer 508, PIP video DRAM 506, and FIFO 509. Adder 507 consecutively adds three lines together to get one weighted line of PIP. The DRAM 560 is used as storage in conducting the addition as well as for storing other weighted lines.

When the PIP video data is needed (e.g. a user of the television requests, typically via infrared commands, that a picture-in-picture function is to be accomplished), the PIP information is forwarded from the PIP video DRAM 506 to the PEP 20 via multiplexer 52. As shown in FIG. 1b, multiplexer 52 is part of PIP read means 520 which adds borders to the PIPs and positions them properly as part of a larger picture. The other input into multiplexer 52 comes from the main video signal which is converted into a digital signal by A/D converter 180 and decoded into its components by digital decoder 182.

In most of the hereinafter discussed modes of the invention, the information received by multiplexer 52 is forwarded to the mixer 62 of PEP 20. The mixer processes the received information according to the predetermined function, with the value K being determined by the parameter control means 64. As indicated, the parameter control means 64 includes a subtraction means 641, a low pass filter 642, a rectifier 643, a programmable ROM 644, and a multiplexer 645. In essence, the parameter control means 64 is a motion detector which determines how significantly a previous field differs from a current field. Where there is little motion, it is desirable to mix a good deal of the previous field into the present field, while where there is a lot of motion (much change), only a small mount of mixing is desirable. Thus, the subtraction means 641 functions to subtract a previous field (obtained from 2.56 megabit field memory 40 via multiplexer 54) from a current field. The difference is filtered by the low pass filter 642 which eliminates the high frequency components of the signal which are not relevant. The filtered difference signal is then rectified, as only the absolute difference is important (i.e. the direction of difference is unimportant). The rectified filtered difference signal is then fed to PROM 644 which preferably generates an exponential curve from the linear input signal, thereby advantageously causing the value of K to change extremely quickly when significant motion as been detected.

Processed current data is forwarded to the progressive scan processor 30 both directly and via FIFO 190a which introduces a line delay. Delayed or stored information in the field memory 40 is likewise forwarded to the progressive scan processor 30 via FIFO 190b which is used to adjust the field memory to a full two hundred and sixty-three lines. As indicated, the three different video sources are used by the median filter 302 for accomplishing the desired filtering, while the current video and line delayed "current video" may also be averaged by averaging means 304. Regardless, a multiplexer 306 selects the source (usually median filter 302) of interpolated data, which is forwarded via FIFO 192a to a video D/A converter 198. Also forwarded to video D/A converter 198 is the current data via FIFO 192b, and the current video color component via color separator 308 and FIFO 192c.

Figure 10:
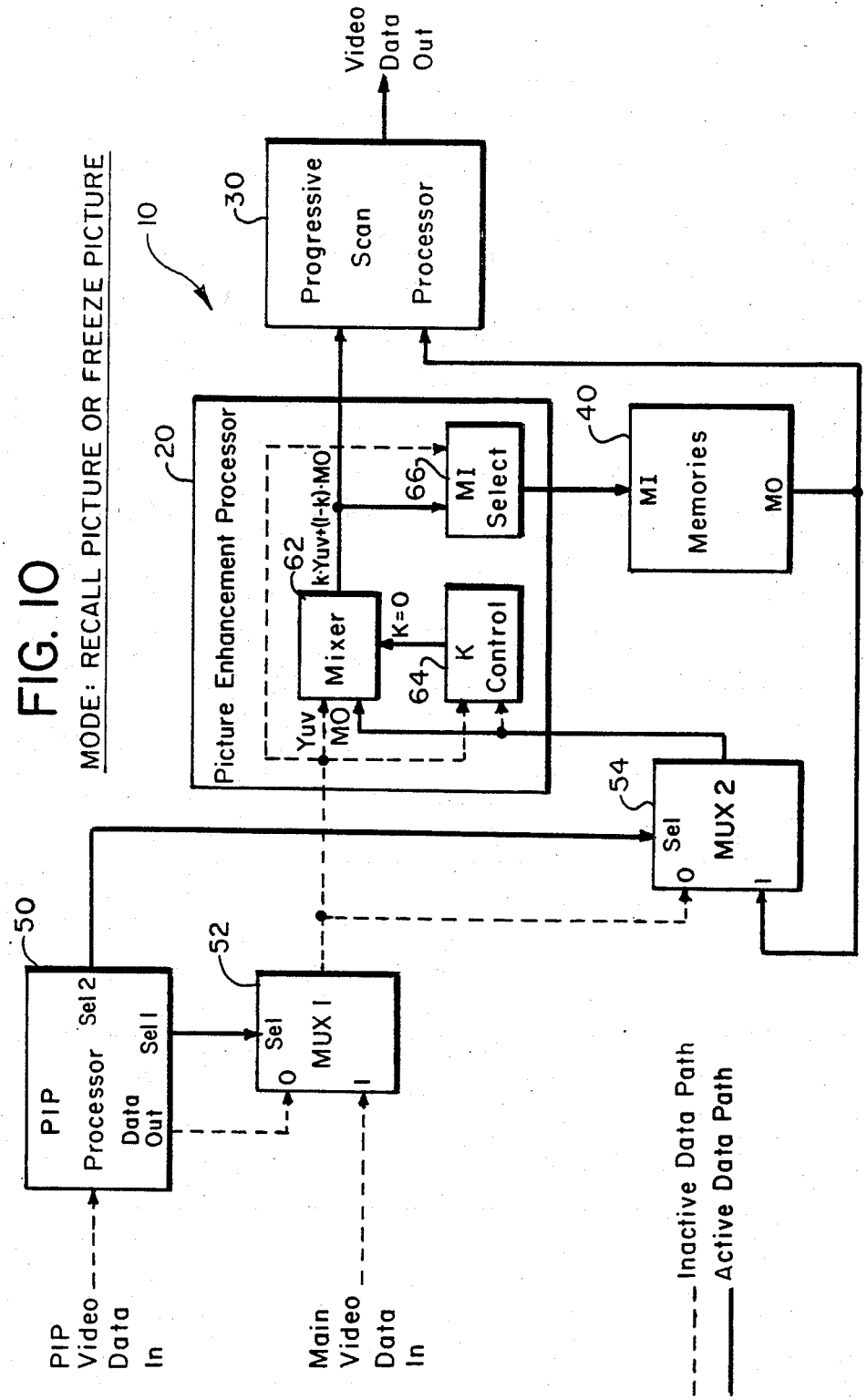
FIG. 10 is a block diagram with indicated data paths for the recall picture or freeze picture mode of the invention.
Figure 11:
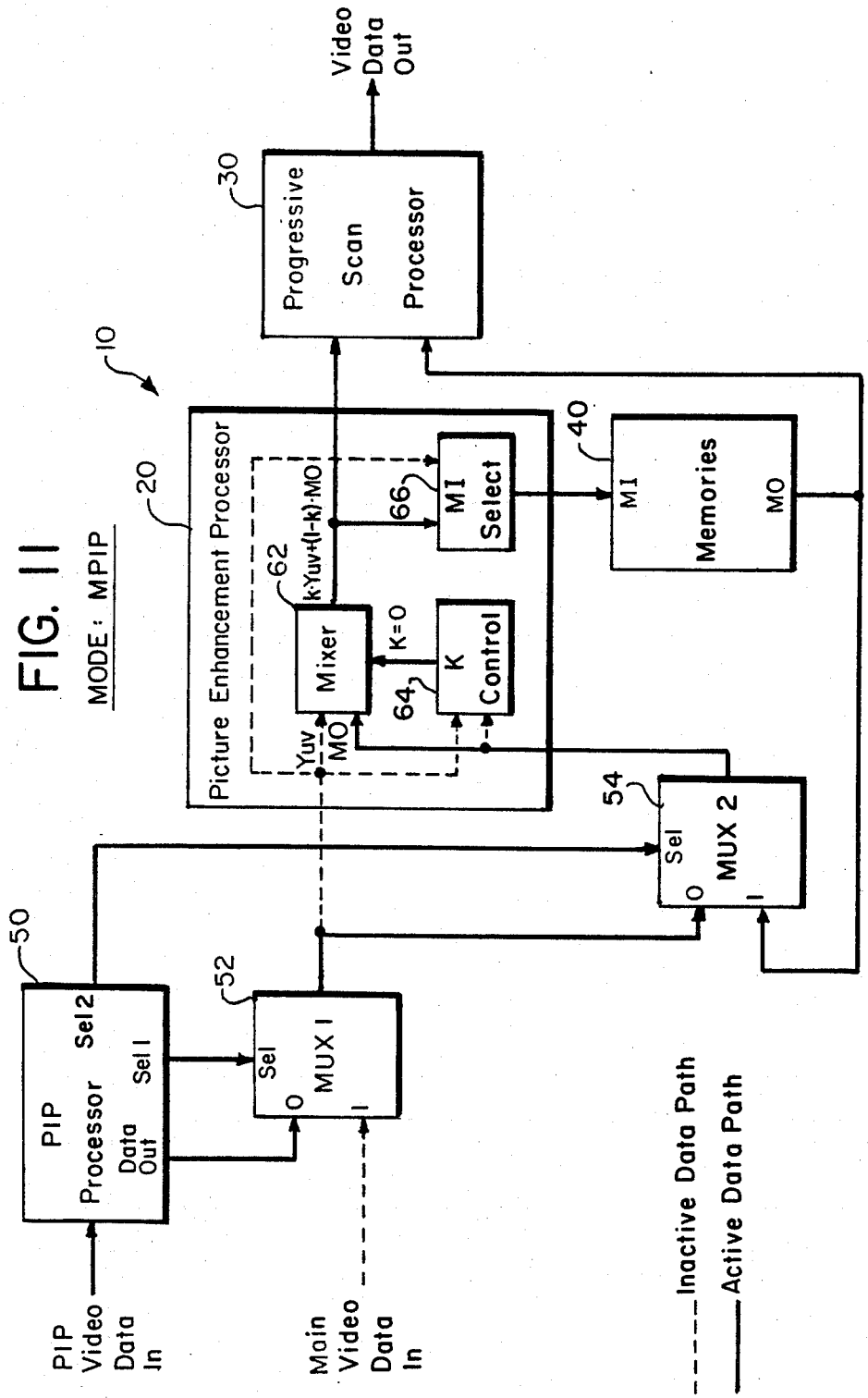
FIG. 11 is a block diagram with indicated data paths for the multiple PIP mode of the invention.

With the provided circuitry of FIGS. 1a and 1b, and by providing different data paths for the incoming video data, the digital television processing section 10 is capable of operating in various modes, including direct video and direct video plus PIP (FIGS. 2 and 3), noise reduction and noise reduction plus PIP (FIGS. 4 and 5), cross-color reduction and cross-color reduction plus PIP (FIGS. 6 and 7), stored picture and stored picture plus PIP (FIGS. 8 and 9), freeze or recall picture (FIG. 10), and multiple PIP (FIG. 11).

Figure 3:
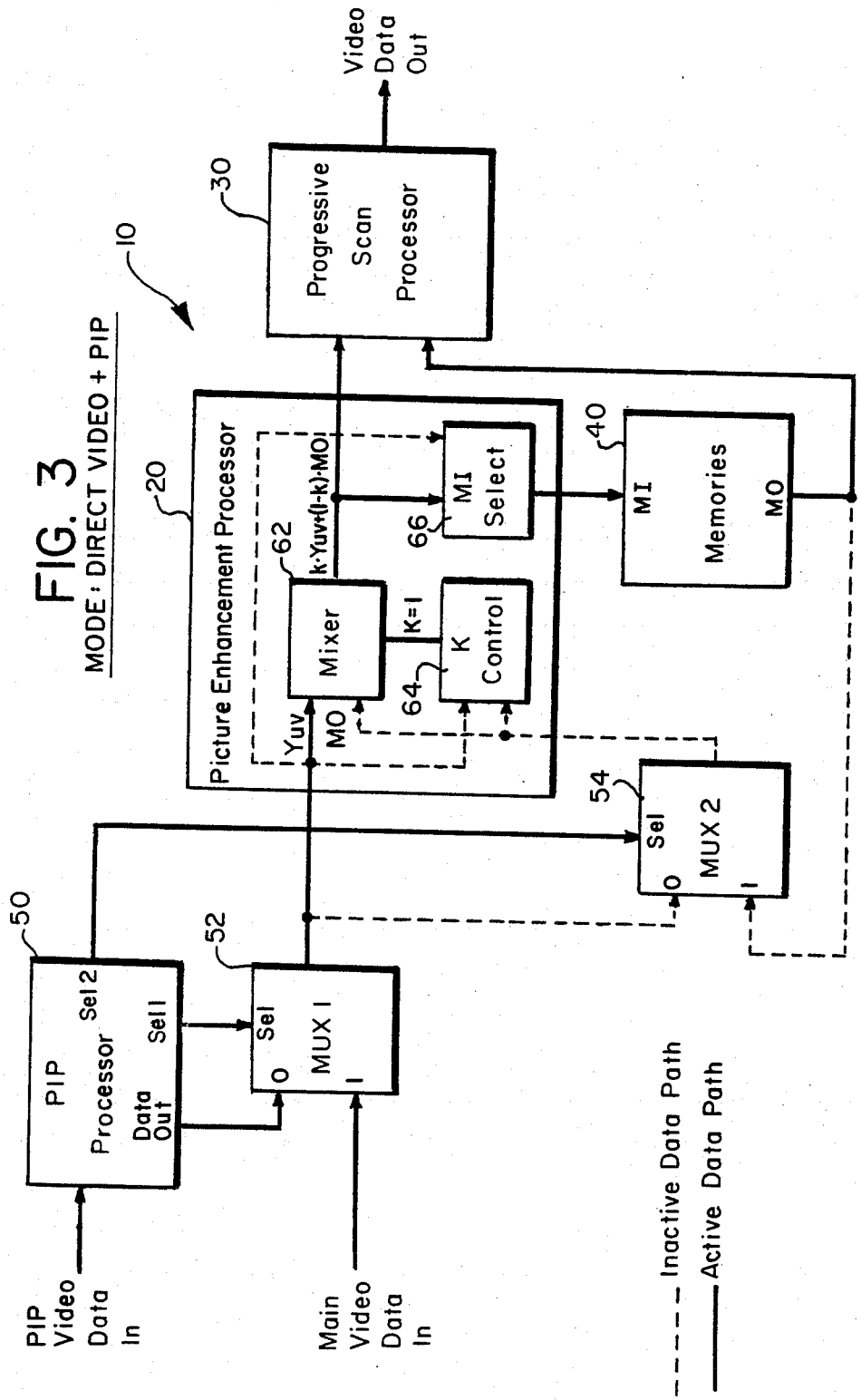
FIG. 3 is a block diagram with indicated data paths for the direct video with PIP mode of the invention.

Turning to FIGS. 2 and 3, the direct video and direct video plus PIP modes are shown. In the direct video mode, the main video data is sent via multiplexer 52 to the mixer 62 of PEP 20, while in the direct video plus PIP mode, PIP data is processed in PIP processor 50, and the main video and PIP video data are multiplexed by multiplexer 52 and sent to the PEP mixer 62. Due to the fact that in the direct video (and direct video plus PIP) mode, the control parameter K of control means 64 is set to a value of one, the video data received at the mixer 62 is sent intact to the progressive scan processor 30 and the memory select means 66. From the memory select means 66, the data is forwarded to the memory means 40 where the data is delayed (i.e. the memory means 40 acts as a field delay). From the memory means, the now delayed data is forwarded to the progressive scan processor 30. Thus, both current data and delayed data are received by the progressive scan processor which provides, via known median filtering techniques, a non-interlaced video signal to the television picture tube.

Figure 4:
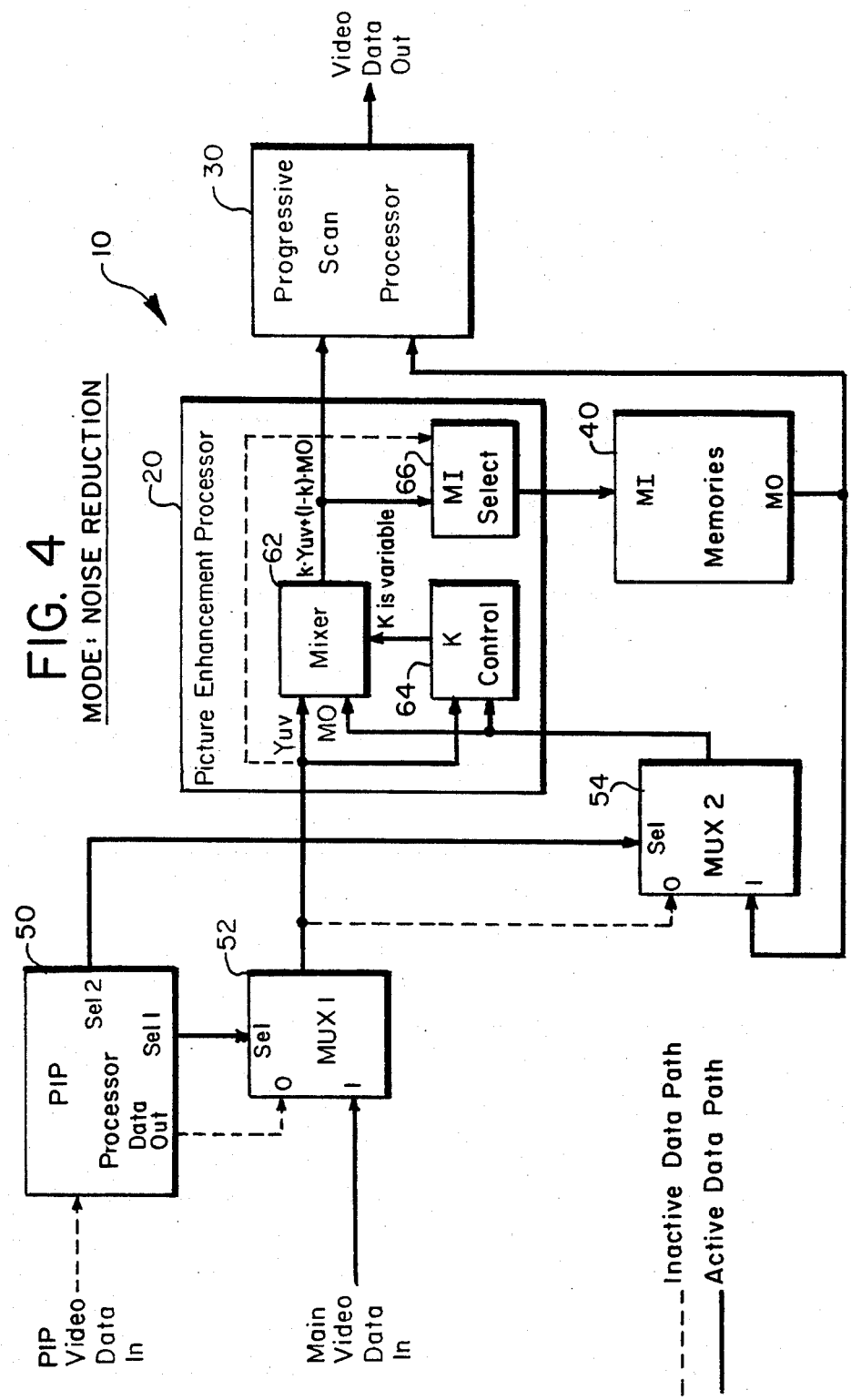
FIG. 4 is a block diagram with indicated data paths for the noise reduction mode of the invention.
Figure 5:
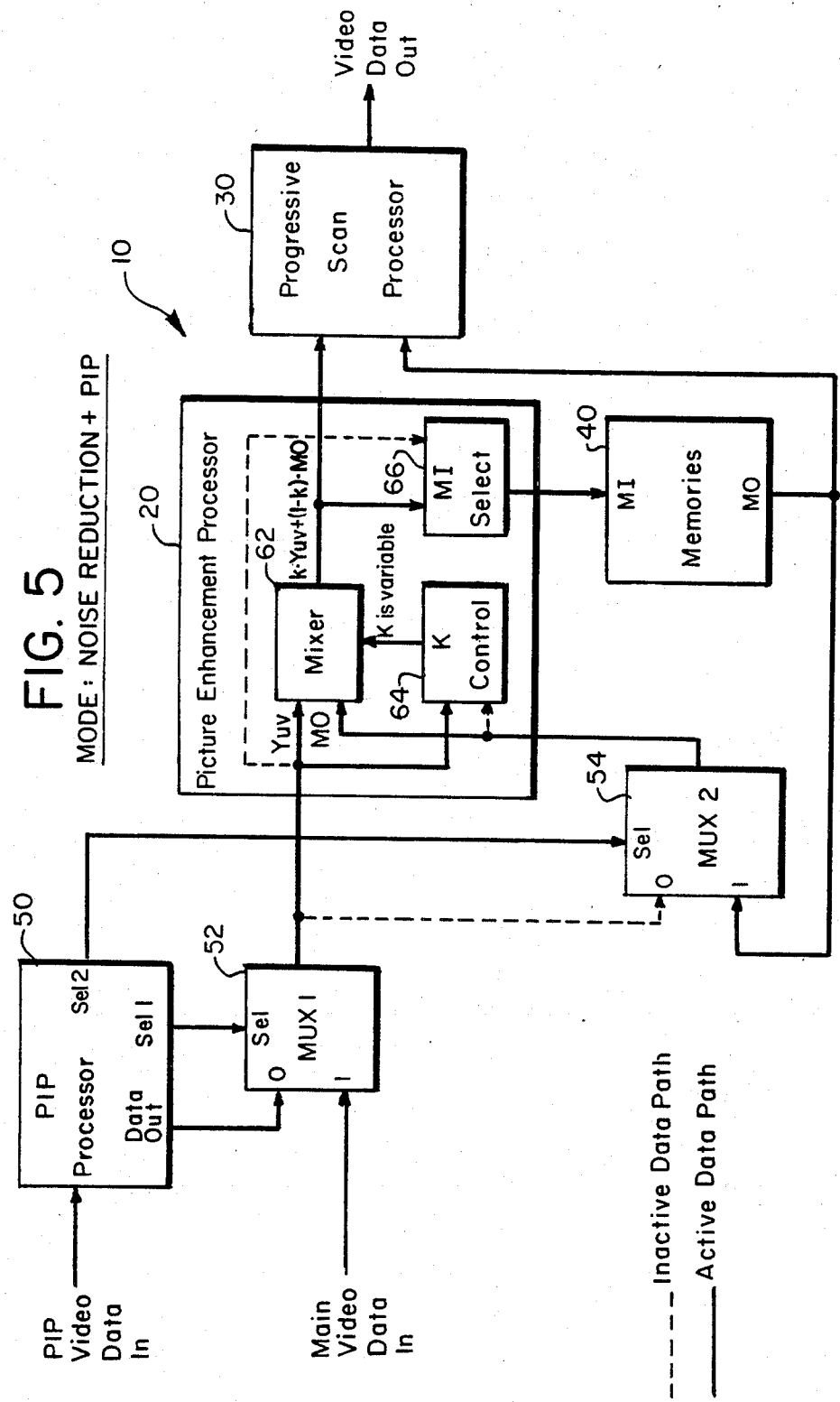
FIG. 5 is a block diagram with indicated data paths for the noise reduction mode with PIP mode of the invention.

Turning to FIGS. 4 and 5, the noise reduction and noise reduction plus PIP modes are seen. In accomplishing noise reduction, the value of parameter K supplied by the control means 64 is variable and is a function of the incoming signal and previously received signal. Thus, the main video signals, or the main video plus PIP video signals (FIG. 5) are received in the mixer 62 of PEP 20 from multiplexer 52, and are processed according to the previously discussed equation. The current video signals are also sent to the parameter control means 64. The output of mixwer 62 is forwarded to both the progressive scan processor 30 and the memory select means 66. The memory select means 66 forwards the processed data to desired locations in common memory means 40 which acts as a field delay. The delayed information is then fed forward to the progressive scan processor 30 so that median filtering utilizing the current and delayed data may be accomplished. The delayed information is also fed back to the parameter control means 64 and the mixer 62 of the PEP 20 via multiplexer 54. With such feedback, the parameter control means 64 is able to compare the incoming signal with the processed and delayed previous signal, and thus provide a desired value K to the mixer. Also, with the varying signal K, the delayed processed signal (MO), and the current signal (Y,U,V) entering the mixer, the mixer 62 is able to properly accomplish the necessary processing.

It is of note that in the noise reduction and noise reduction plus PIP modes, the memory means 40 acts both as a memory (field delay) for the PEP noise reduction algorithm which requires a feedback loop with field delayed data, as well as a memory for the progressive scan progressor which requires a feed-forward arrangement with field delayed data for its median filtering. It is also of note, that the PIP data is also benefitted by the noise reduction carried out by the PEP 20, as it is the whole field, including the PIP data which is sent via multiplexer 52 to the PEP 20.

Figure 6:
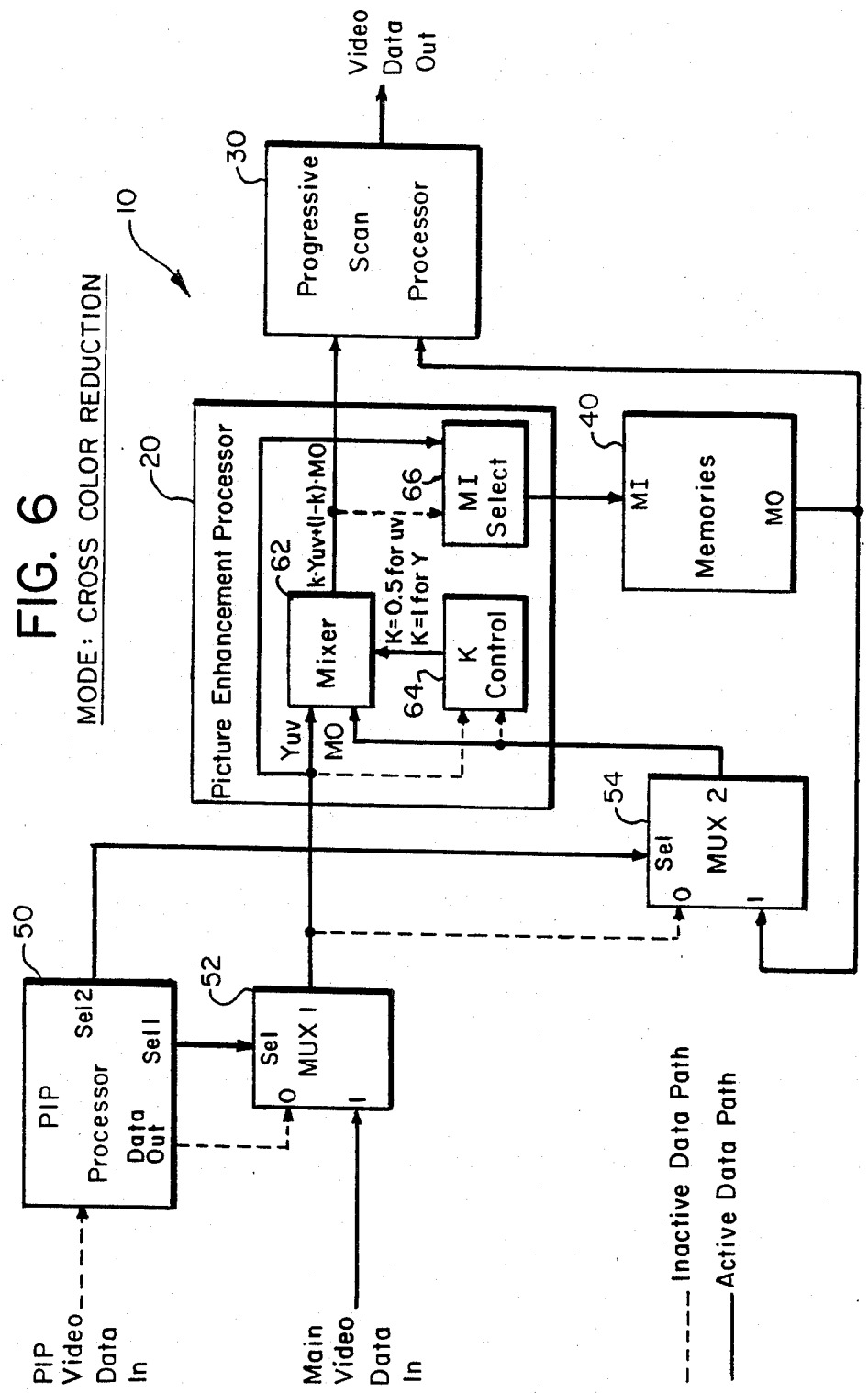
FIG. 6 is a block diagram with indicated data paths for the cross-color reduction mode of the invention.
Figure 7:
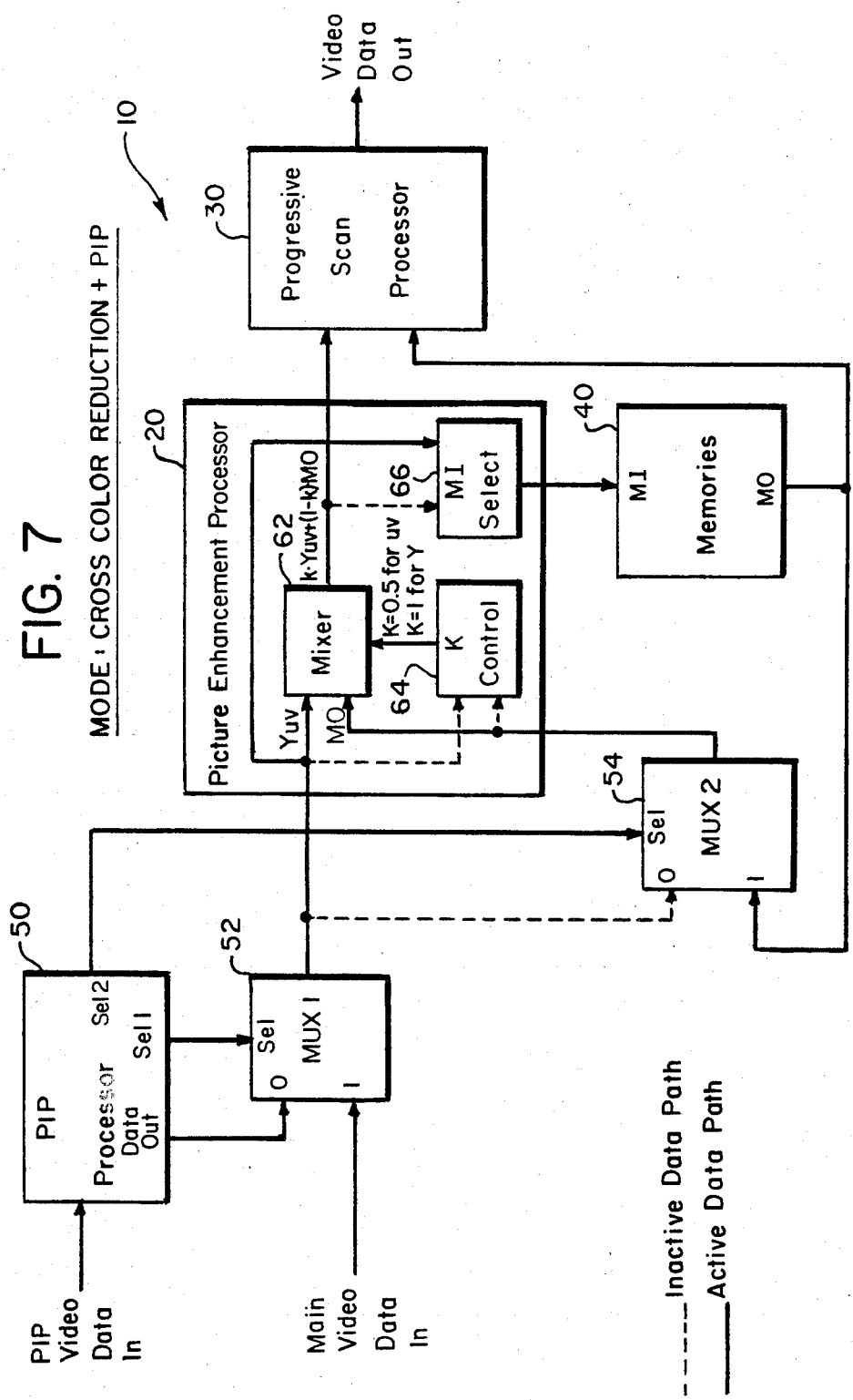
FIG. 7 is a block diagram with indicated data paths for the cross-color reduction with PIP mode of the invention.

The cross-color reduction and cross-color reduction plus PIP modes of FIGS. 6 and 7 are quite similar in data path arrangement to the noise reduction modes of FIGS. 4 and 5. However, instead of providing the common memory 40 with processed data, the incoming data is sent directly to the memory select means 66 and then to common memory 40. The common memory 40, which acts as a field delay, then forwards the delayed video data to the progressive scan processor 30 and to the mixer 62 of PEP 20. Also, instead of providing the parameter control means 64 with current information via multiplexer 52 and delayed information from common memory means 40, the parameter K is set to a value of one for the luminance component Y, and to a value of 0.5 for color components U and V. This arrangement permits the color signals from the incoming data field and the previous field to be averaged (via adding and multiplying by 0.5), thus canceling out the color subcarrier waveform. Again, it is of note that the common memory means 40 is acting as the memory means for the PEP feedback loop (mixer 62, to memory select means 66, to common memory means 40, to mixer 62), as well as the memory means for the progressive scan processor feed-forward loop (multiplexer 52, to memory input select 66, to common memory means 40, to progressive scan processor 30). Also, again, the PIP video data benefits from the processing (cross color reduction) of the PEP 20.

Figure 8:
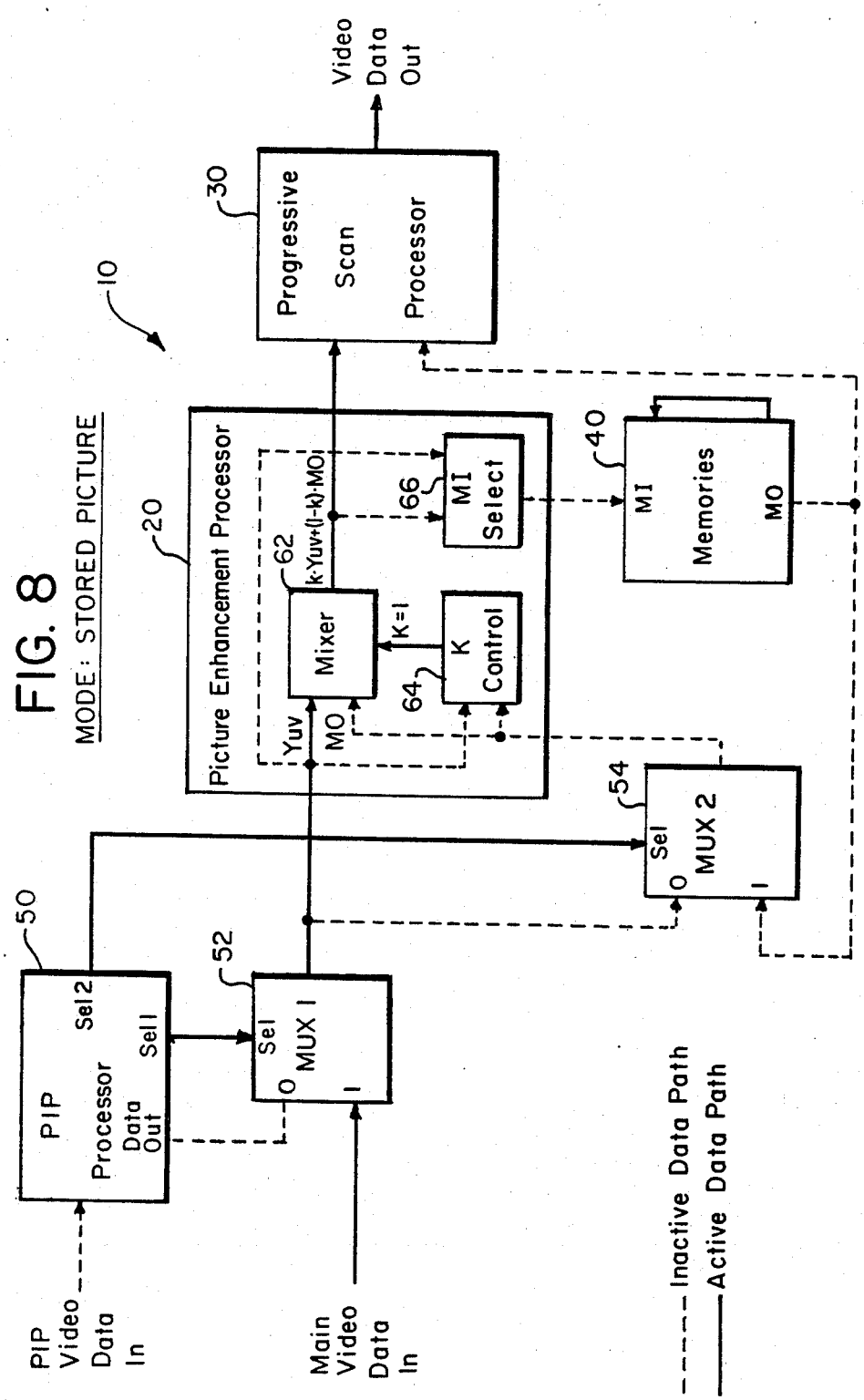
FIG. 8 is a block diagram with indicated data paths for the stored picture mode of the invention.
Figure 9:
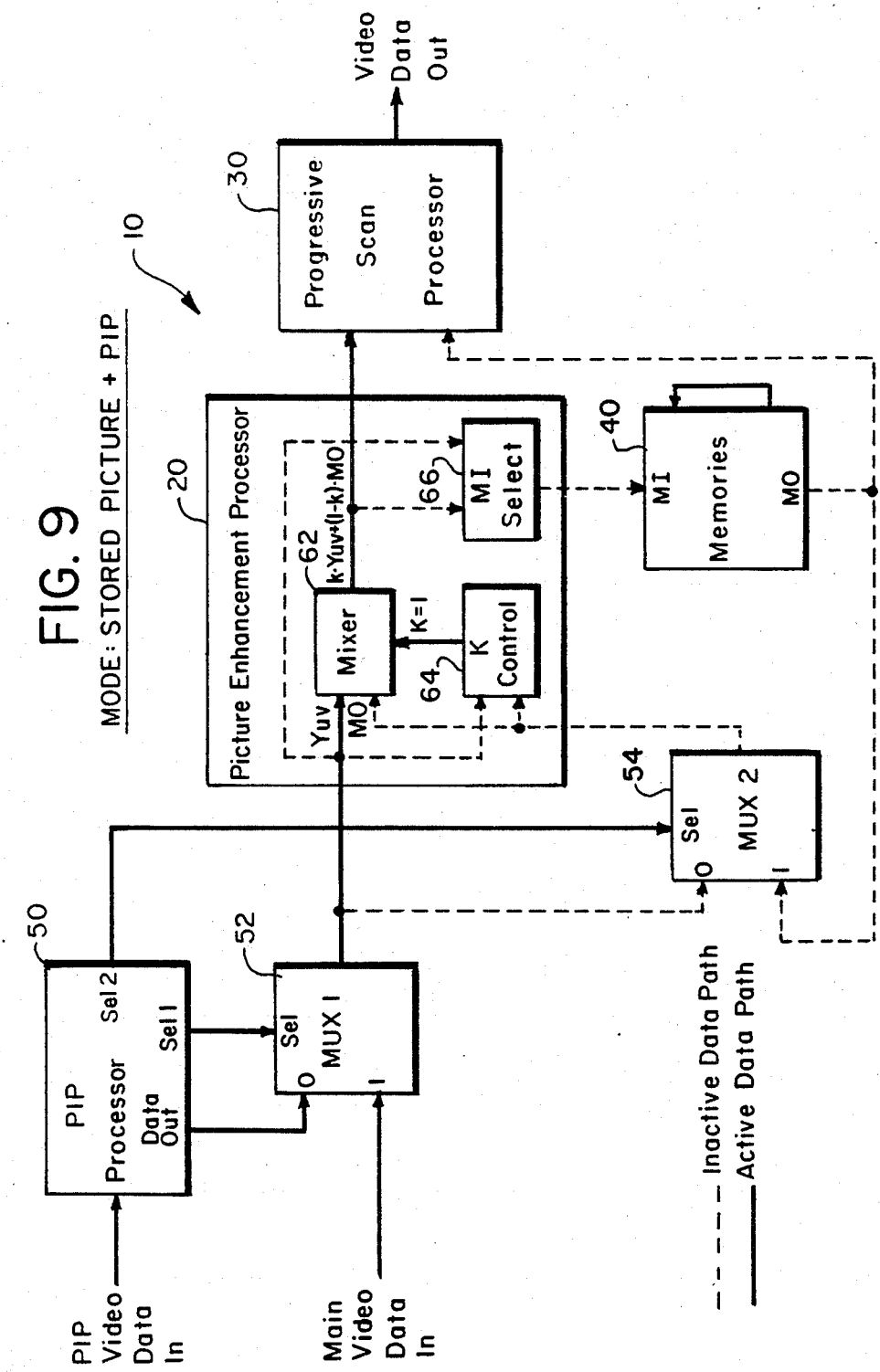
FIG. 9 is a block diagram with indicated data paths for stored picture with PIP mode of the invention.

The stored picture and stored picture plus PIP modes of FIGS. 8 and 9 relate to the recall picture or freeze picture mode of FIG. 10. In the stored picture modes the main video data (multiplexed with the PIP video data in FIG. 9) is sent via multiplexer 52 to the PEP 20 where it is forwarded intact to the progressive scan processor 30. The video data contained in common memory means 40 is retained in the common memory means either by internal recirculation where the memory means is a charged coupled device, or by disabling any writing into memory where the memory means is a DRAM. No data is forwarded from the common memory means 40 to the progressive scan processor, and hence median filtering is not performed. The picture stored in the common memory means 40 may be recalled or may be used as a frozen picture as indicated in FIG. 10. The picture in the common memory means 40 is forwarded to the mixer 62 of picture enhancement processor 20. With the parameter K being set to a value of zero, any PIP or main video data is ignored, and only the common memory means data is forwarded to the progressive scan processor 30. In order to maintain the data in the common memory means, the data in the common memory is either forwarded via the memory input select means 66 back into the common memory means 40 so that a recirculating feedback path (memory means 40, mux 54 to mixer 62, memory select means 66, memory means 40) is established, or the data is read from the memory means but not deleted therefrom. The data in the common memory means 40 is also forwarded to the progressive scan processor so that median filtering may be accomplished if desired. It will be appreciated that the data in memory means 40 may comprise main video data or main video data plus PIP data from at least one secondary channel.

The multiple PIP mode of the invention is seen in FIG. 11. In accord with the preferred embodiment, where more than three PIP channels are to be viewed, main video data is not viewed (although, main video could be active if desired). The PIP video data is processed in the PIP processor 50, and sent through multiplexer 52 which does not (in the preferred embodiment) process the main video data. Instead of forwarding the multiple PIP data directly to the YUV port of mixer 62 of PEP 20, however, the data is sent to multiplexer 54 and then to the memory output (MO) port of the mixer 62. The data is therefore treated in a similar manner to the recalled or frozen picture mode of FIGS. 9 and 10 in that the parameter K is set to zero, and the data which is forwarded from mixer 62 to the progressive scan processor 30 is the non-processed, intact data which was received at the MO port of the mixer 62. If desired, multiplexer 54 could be located between the memory select means 66 of the PEP 20 and the memory means 40. With such an arrangement, the multiple PIP data would first be stored in memory 40 prior to being forwarded to the memory output (MO) port of the mixer 62. Regardless, parameter K would still be set to zero.

In the multiple PIP mode, data from the mixer 62 is forwarded both the progressive scan processor 30 and to the common memory means 40. The information in the common memory means 40 is then recirculated via multiplexer 54 back to the MO port of the mixer 62 of the PEP 20. Thus, up to nine PIPs (which would provide an entire screen) may be recirculated in a "frozen" mode. However, because a PIP field may be processed live by the PIP processor in each entire screen field frame, that live information may be forwarded to multiplexer 54 and inserted in its proper location by having the PIP processor 50 properly toggling the select port by the multiplexer 54. Of course, the timing of the selection will depend on which PIP is to be updated. If desired, the PIP to be updated can be changed each cycle such that the PIPs will update at approximately one-ninth the normal update speed.

There has been described and illustrated herein a television processing section which utilizes a common memory for conducting picture enhancement processing, progressive scan processing, and PIP processing. While a particular embodiment of the invention has been described, it is not intended that the invention be limited thereby as it is intended that the invention be broad in scope. Therefore, it will be appreciated that the invention is intended to encompass processing sections for analog televisions as well as for digital televisions, and for televisions that process color information in the RGB (red green blue) format or other format as well as the YUV format. Moreover, various changes to the provided block diagram and the provided results are perceived as being included within the scope of the invention and could occur if the PIP processor block 50, or the PEP block 20 had different capabilities. For example, if the PIP processor or additional PIP processors were capable of providing a plurality of updated fields per cycle or of receiving and processing more than nine PIP images, the multiplexer 54 could be controlled to insert those plurality of fields into the data path. In this manner, more than one live PIP could be provided either as part of a nine or more PIP picture or as part of a main video picture. Also, if the PEP 20 had a means for instantaneously controlling the parameter control means 64 such that it could instantly provide values of zero and one for K (e.g. a control port on the K control means under the control of, e.g. the PIP processor), the need for multiplexer 54 would be obviated. Thus, as life PIP or main video data were provided via multiplexer 52, the K value would be set to one. When the recirculated (frozen) data from the multiple PIPs were provided from the common memory means 40, the K value would be set to zero.

Further, it will be appreciated that while common memory means 40 was described as comprising a charged coupled device or a DRAM, any memory means which is capable of receiving and sending information in a first-in-first-out (FIFO) manner is acceptable. In fact, if desired, memories other than FIFOs could be utilized provided minor modifications were made in the data paths. Moreover, while data paths have been described, it will be appreciated that data may be sent and in essence ignored (such as the MO data when K is set to one, or data reaching a multiplexer when the multiplexer is forwarding data from another channel), or the data need not be sent at all (e.g. it may be overwritten in memory). For purposes herein, the two situations are equivalent, and terminology suggesting one state or the other is to be read broadly to include the other. Indeed, terminology such as "processed" data is likewise to be read broadly to be inclusive of multiplication by 1 such as the processing of current video data when K is set to a value of one, or the processing of delayed data from memory when K is set to a value of zero. Also, "YUV" data is to be read broadly as to be inclusive of RGB or other color information of a different format. Therefore, it will be apparent to those skilled in the art that yet other changes and modifications may be made to the invention as described without departing from the scope of the invention as so claimed.

We claim:
1. A television processing section, comprising:
(a) a picture enhancement processor for receiving at least current video data from a main video data source, said picture enhancement processor comprising a mixer, a parameter control means, and a memory select means;
(b) a progressive scan processor, and
(c) a memory means for use with both said picture enhancement processor and said progressive scan processor, wherein,
said progressive scan processor is arranged to receive said current video data from said picture enhance- ment processor and delayed video data from said memory means, said memory means is arranged to receive said current video data from said memory select means of said picture enhancement processor, to delay said current video data, and to release said delayed video data to said progressive scan processor and to said mixer of said picture enhancement processor.

2. A television processing section according to claim 1, wherein:

said mixer obtains said current video data and said delayed video data, processes said current and delayed video data according to a predetermined relationship to obtain processed current video data, wherein said current video data received by said progressive scan processor and by said memory means is said processed current video data.

3. A television processing section according to claim 2, wherein:

said television processing section functions in a plurality of modes; and said predetermined relationship is K·YUV+(1−K)·MO, where K is a parameter having a value between zero and one inclusive, YUV is said current video data, and MO is said delayed video data.

4. A television processing section according to claim 3, wherein:

in a noise reduction mode, said current video data and said delayed video data are obtained by said mixer and said parameter control means, and said parameter control means determines a value for K based on said current and said delayed video data and supplies said value for K to said mixer.

5. A televison processing section according to claim 3, wherein:

in a cross color reduction mode, said current video data are obtained by said mixer and said memory select means, said delayed video data are obtained from said memory means by said mixer, and said parameter control means provides a value of 0.5 for K for color components of said current and delayed video data and a value of 1 for K for luminance components of said current and delayed video data.

6. A television processing section according to claim 3, wherein:

in at least one of a stored picture, recall, and freeze mode, data received and stored in said memory means is retained within said memory means.

7. A television processing section according to claim 3, wherein:

in a recall or freeze picture mode, said parameter control means provides a value of zero for K.

8. A television processing section according to claim 1, further comprising:

(d) picture in picture processing means for obtaining secondary video data from a secondary source and for processing said secondary video data;

(e) first multiplexer means, for obtaining main video data from a main video source and said processed secondary video data, for multiplexing said main video data and said processed secondary video data, and for sending said multiplexed data as said current video data to said picture enhancement processor.

9. A television processing section according to claim 8, wherein:

said mixer obtains said current video data and said delayed video data, processes said current and delayed video data according to a predetermined relationship to obtain processed current video data, wherein said current video data received by said progressive scan processor and by said memory means is said processed current video data.

10. A television procesing section according to claim 9, wherein:

said television processing section functions in a plurality of modes; and said predetermined relationship is K·YUV+(1−K)·MO, where K is a parameter having a value between zero and one inclusive, YUV is said current video data, and MO is said delayed video data.

11. A television processing section according to claim 10, wherein:

in a multiple picture in picture mode said current video data consists of secondary video data from at least one secondary video source, and said mixer is supplied with a data field comprised of current video data from said first multiplexer means and at least one of delayed video data from said memory means and stored video data from said memory means.

12. A television processing section according to claim 11, further comprising:

(f) second multiplexer means for obtaining said current video data from said first multiplexer means and said at least one of delayed and stored video data from said memory means, and for multiplexing said current video data and at least one of said delayed and stored video data, wherein said mixer has a first data port for receiving said current video data, and a second data port for receiving delayed and stored video data from said memory means, and said second multiplexer means further supplies multiplexed data as said data field to said second data port of said mixer, and wherein said parameter control means provides a value of zero for K.

13. A television processing section according to claim 11, wherein:

said picture enhancement processor further comprises means for controlling said parameter control means such that in a single data field, when said current video data is supplied to said mixer said parameter control means provides a value of one for K, and when said delayed or stored video data is supplied to said mixer said parameter control means provides a value of zero for K.

14. A television processing section according to claim 10, wherein:

in a noise reduction plus picture in picture mode, said current video data and said delayed video data are obtained by said mixer and said parameter control means, and said parameter control means determines a value for K based on said current and said delayed video data and supplies said value for K to said mixer.

15. A television processing section according to claim 10, wherein:

in a cross color reduction plus picture in picture mode, said current video data are obtained by said mixer and said memory select means, said delayed video data are obtained from said memory means by said mixer, and said parameter control means provides a value of 0.5 for K for color components of said current and delayed video data and a value of 1 for K for luminance components of said current and delayed video data.

16. A television processing section according to claim 10, wherein:

in at least one of a stored, recall, and freeze picture plus picture in picture mode, data received and stored in said memory means is retained in said memory means.

17. A television processing section according to claim 8, wherein:

said current video data is comprised of said main video data from said main video data source and secondary video data from up to three secondary video data sources.

18. A television processing section according to claim 17, wherein:

where said current video data is comprised of said main video data and said secondary video data from more than one secondary video source, said picture in picture processor processes said secondary video data from more than one secondary video source to provide one current picture in picture and two frozen pictures in picture.

19. A television processing section according to claim 8 which functions in a plurality of modes, further comprising:

(f) second multiplexer means, wherein, in a multiple picture in picture mode from said first multiplexer means receives processed secondary video data of at least two secondary sources from said picture in picture processing means and sends said received processed secondary video data to said second multiplexer means, and wherein the output of said second multiplexer is coupled to said memory means.

20. A television processing section according to claim 19, wherein:

said mixer has a first data port for receiving current video data and a second data port for receiving at least one of delayed video data and stored video data from said memory means, and said mixer processes said current video data and said delayed video data according to $K \cdot YUV + (1-K) \cdot MO$, where K is a parameter having a value between zero and one inclusive, YUV is said current video data, and MO is said delayed video data, and wherein in said multiple picture in picture mode, said mixer is supplied at said second data port with at least said processed secondary video data delayed by said memory means, and said parameter control means provides a value of zero for K.

* * * * *